United States Patent [19]
Kobayashi

[11] Patent Number: 4,805,409
[45] Date of Patent: Feb. 21, 1989

[54] METHOD OF AND APPARATUS FOR RECOVERING EXHAUST GAS ENERGY OF INTERNAL COMBUSTION ENGINE

[75] Inventor: Hideaki Kobayashi, Sakura, Japan
[73] Assignee: Hitachi, Ltd., Tokyo, Japan
[21] Appl. No.: 184,116
[22] Filed: Apr. 21, 1988
[30] Foreign Application Priority Data
Apr. 24, 1987 [JP] Japan .................... 62-100129
[51] Int. Cl.⁴ .............................. F02G 5/02
[52] U.S. Cl. ..................................... 60/597
[58] Field of Search ............... 60/597, 598, 605, 607, 60/608, 624

[56] References Cited
U.S. PATENT DOCUMENTS
4,665,704 5/1987 Hartwig .................. 60/597
4,745,754 5/1988 Kawamura ............... 60/597 X FOREIGN PATENT DOCUMENTS
141634 5/1985 European Pat. Off. ........... 60/597
207342 1/1987 European Pat. Off. ........... 60/597
46242 12/1978 Japan .
59010 4/1982 Japan .
214615 12/1983 Japan ..................... 60/597
18231 1/1984 Japan ..................... 60/597

Primary Examiner—Michael Koczo
Attorney, Agent, or Firm—Antonelli, Terry & Wands

[57] ABSTRACT

Disclosed is a type of an exhaust gas energy recovery method for an internal combustion engine of a type which incorporates a turbine generator driven by the exhaust gas energy of the internal combustion engine and in which the driving power of a motor driven by the power generated by the generator is added to the driving power of the internal combustion engine. The method also incorporates a control device for controlling the output torque of the motor in different forms at low and high speed areas within a variable control range of the rotation speed of the internal combustion engine. The motor is operated with constant torque characteristics at the low speed area and with reduced torque characteristics at the high speed area thereby enabling the exhaust gas energy to be efficiently recovered at an engine speed area where the ratio of engine-operating time is high.

7 Claims, 4 Drawing Sheets

METHOD OF AND APPARATUS FOR RECOVERING EXHAUST GAS ENERGY OF INTERNAL COMBUSTION ENGINE

BACKGROUND OF THE INVENTION

1. Field of the Invention

The present invention relates to a method of recovering exhaust gas energy of an internal combustion engine such as a gasoline engine, and, more particularly, to a method of and an apparatus for recovering exhaust gas energy of an internal combustion engine which are suitable for use in an automobile.

2. Description of the Prior Art

Heat engines are in general not efficient. Even in a relatively efficient internal combustion engine, more than half of consumed energy is discarded as waste.

Accordingly, method of recovering exhaust gas energy so as to enable efficient use of the discarded energy was proposed in, for example, the Japanese Patent Application Laid-Open No. 57-59010.

In this known method, a turbine generator is driven by exhaust gas energy, and a motor directly connected to an internal combustion engine is in turn driven by the power of this generator so as to achieve energy recovery. However, the laid-open publication does not disclose a concrete mean of controlling the motor by the power of the generator: it is not taken into consideration in this method.

In another type of conventional technique such as those disclosed in Japanese Patent Publication No. 53-46242, control system for diving an electric motor in constant or reduced torque characteristics was also known. The control of the electric motor directly connected to the internal combustion engine, however, was not disclosed concretely, either. It is not taken into consideration either.

In an engine used in an automobile, the engine speed (rotation speed) N thereof and the torque $T_E$ of the output shaft thereof in general have a relationship such as that shown by a curve A in FIG. 4. As can be seen from the curve A, the engine has a small torque $T_E$ at a low speed area Al, and the torque $T_E$ thereof slightly reduces at an area A2 at which the engine speed N is extremely high.

Further, as shown by curves B1 and B2 in FIG. 5 whose abscissas and ordinates respectively represent the engine speed N and the rate D of engine operating time at each engine speed N, the engine is used most of the time around an engine speed nl (for example 2,000 to 3000 r.p.m) which is substantially one-half of the maximum engine speed Nmax (about 6000 to 7000 r.p.m in the case of a gasoline engine) or less. A hatched area B3 defined by the curves B1 and B2 denotes variations in the rate D of engine operating time at each engine speed N.

More specifically, the curve B1 corresponds to the rate D in a state where the throttle valve of the engine is nearly closed, while the curve B2 corresponds to the rate D in a state where the throttle valve of the engine is largely opened. As the amount of energy recovered can be defined by a product of the engine-operating time rate D of engine-operating time at a rotation speed N and the output or power of the motor at the speed N, the efficient of energy recovery can be made higher, when the power of the motor is made higher at an area where the rate D is higher.

In the above-described simple aggregation of the known methods of recovering exhaust gas energy, however, the area which exhibits high engine-operating time rate D and the area at which energy can be recovered highly efficiently do not coincide.

If the electric motor is operated or driven at a constant torque characteristics or mode which is most generally employed in the operation thereof, an effective power recovery is not effected, and these known methods suffer from the following disadvantages:

A very high torque cannot be obtained at a low speed area at which the largest torque is required, precluding a sufficient degree of power recovery.

Despite the fact that the required torque becomes relatively small as the maximum engine speed Nmax approaches, the motor is driven at a high power, increasing its loss (caused by non-load loss) and reducing its efficiency remarkably. At the same time, a raised temperature of the motor reduces a life thereof and hence a reliability.

At the area which exhibits a relatively high engine operating time rate D, e.g., at the area of an engine speed which is one-half to one-thirds of the maximum engine speed Nmax or less, sufficient power recovery is not effected. At an area of a high engine speed N, less torque is generally required. These operating conditions result in utilization of only half of the capacity or power of the electric motor.

In this specification, the term "efficiency" may be referred to as a ratio or proportion of energy transmitted to the output shaft of the engine with respect to the energy supplied by the combustion of the fuel in the engine averaged over time during operation thereof, taking the ratio D into consideration. In addition, the term "efficiency" may also be referred to as a proportion of the energy utilized to drive the output shaft of the engine or power by the motor with respect to the energy generated by the generator in considering or evaluating the energy recovery at the high speed area.

SUMMARY OF THE INVENTION

Accordingly, an object of the present invention is to provide a method of recovering exhaust gas energy of an internal combustion engine which can obviate the aforementioned problems of the prior art at least partly and which is always capable of recovering exhaust gas energy efficiently by supplying an appropriate level of driving power to the motor at both low and high speed areas.

The above-described object is achieved by controlling an electric motor for recovering exhaust energy in such a manner that it has constant torque characteristics [V/F=k (constant)] at a low engine speed area and that it exhibits reduced torque characteristics at a high engine speed area, where V is the drive voltage of the motor and F is the drive frequency thereof. The reduced torque characteristics mean that V/F<k, preferably, that dV/dF<0, and, typically, that the voltage V is constant.

Concretely, when an induction motor is used as the motor for recovering exhaust energy, the torque T at which an ac motor such as the induction motor can drive is in general proportional to the square of a given voltage V at a given frequency F:

Maximum torque $T_{max} \propto V^2$.

Further, the rotational speed of the motor $N_M$ is substantially proportional to the frequency F.

Therefore, in order to control the motor in the above-described manner, the relationship between the voltage (V) and the frequency (F) of the exhaust energy recovering motor is employed such that, from the maximum frequency Fmax down to a predetermined value f1 which is one-thirds to one-half thereof, the voltage V is constant, and that at a frequency F which is f1 or less, V/F is substantially constant.

The rotation of an exhaust gas turbine (i.e., the power thereof) is proportional to the strength of an exhaust gas (exhaust gas pressure), and is inversely proportional to the duration of pulsations thereof. Therefore, even when the speed of the internal combustion engine is low and the duration of pulsations of the exhaust gas is long, if the load of the internal combustion engine is large, rotation of the exhaust turbine is high due to the high exhaust pressure, and a large power is therefore obtained from an electric generator connected to the turbine.

The power recovering motor is connected to the internal combustion engine at a constant speed ratio in a driving mode, and the rotation speed thereof is proportional to the engine speed of the internal combustion engine. Therefore, it will be possible to obtain a large power or a torque of the generator even at the low speed. However, if the motor is controlled such that it has constant torque characteristics in which V/F is constant in the overall drive frequency areas of the motor, that is, in the overall engine speed areas, as is the case of the generally known power recovery systems, only the power which is proportional to the speed of the internal combustion engine is recovered, and power can not be recovered to a sufficient degree at the low speed. In consequence, in the present invention, the motor is controlled such that it has constant torque characteristics in which V/F is constant only at the low frequency region in which F<f1, so as to increase the level of the constant drive torque of the motor at the low speed by increasing V/F or V at the low frequency region.

Further, since there is a limitation to utilization of the exhaust gas energy of the engine, there is also limitation to the power supply capacity obtained from it. It is therefore important to utilize the exhaust gas energy as efficiently as possible.

The output or power of the generator can be controlled by a control mechanism or a control device such that it has a given relationship of the frequency and the voltage. Therefore, in this invention, the torque characteristics of the motor are controlled in the manner described above. This enables the power of the generator to be more sufficiently or more efficiently utilized at an intermediate engine speed area in which the operating time rate D of the motor is high, thereby enabling a recovery of a large amount of energy and, therefore, enhancing the efficiency of energy recovery.

In other words, in the present invention, when an induction motor is used, the power of the generator can be utilized most efficiently in the vicinity of the frequency F of the motor which is substantially one-thirds to one-half of the maximum frequency Fmax. In consequence, the torque T of the motor at the relatively low speed becomes two to three times larger than that in the case assumed where the constant torque control of the motor by maintaining V/F constant is simply employed.

BRIEF DESCRIPTION OF THE DRAWINGS

The foregoing and other objects, features, and advantages of the present invention will be made clearer from the following more particular description of preferred embodiments referring to the accompanying drawings in which.

DESCRIPTION OF THE PREFERRED EMBODIMENTS

A method and apparatus of recovering exhaust gas energy of an internal combustion engine according to the present invention will now be described in detail by way of example.

Figure 1:
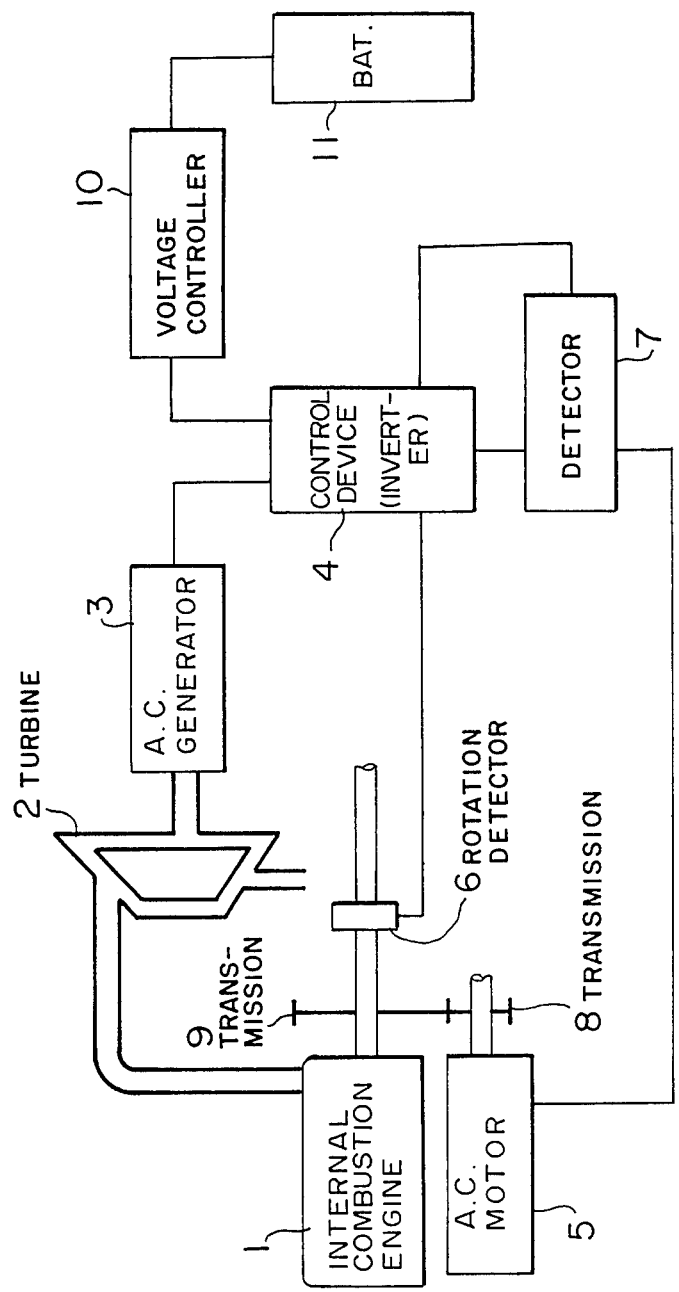
FIG. 1 is a block diagram of an example of an apparatus which is used to carry out a method of recovering exhaust gas energy of an internal combustion engine according to an embodiment of the present invention.

FIG. 1 shows an embodiment of an apparatus of the type which incorporates a control mechanism or a control device provided with an inverter function and an induction motor driven at variable voltage and variable frequency by the control mechanism or control device. In this apparatus, an internal combustion engine 1 is started by a starter (not shown). After it has been started, a turbine 2 is rotated by an exhaust gas of the engine 1 so as to drive an ac generator 3 coupled to the turbine 2. The generator 3 may also be a dc generator. Alternatively, the inverter in the control device 4 may be substituted by a cycloconverter capable of converting a frequency of the ac power from the ac generator 3 into another frequency of ac power directly without converting to dc in the process of frequency conversion.

The power generated by the generator 3 in the above-described manner is adjusted by a control device 4 provided with an inverter function such that it delivers driving energy at suitable frequency F and voltage V, and is then supplied to an ac motor (an induction motor) so as to rotate it.

The motor 5 is connected to the output shaft of the internal combustion engine 1 through power transmission devices 8 and 9 which consist of speed reducing devices such as reduction gears. It is operated such that the power thereof is added to that of the internal combustion engine in acceleration/running mode in which the rotation speed of the gear 9 transmitted from the gear 8 thereto is larger than that of the gear 9 transmitted from the internal combustion engine 1 thereto.

On the other hand, in braking mode, the motor 5 is operated as an electric generator, and the control device 4 is operated in regenerative mode so as to store power in a battery 11 through a voltage control circuit 10.

Figure 2:
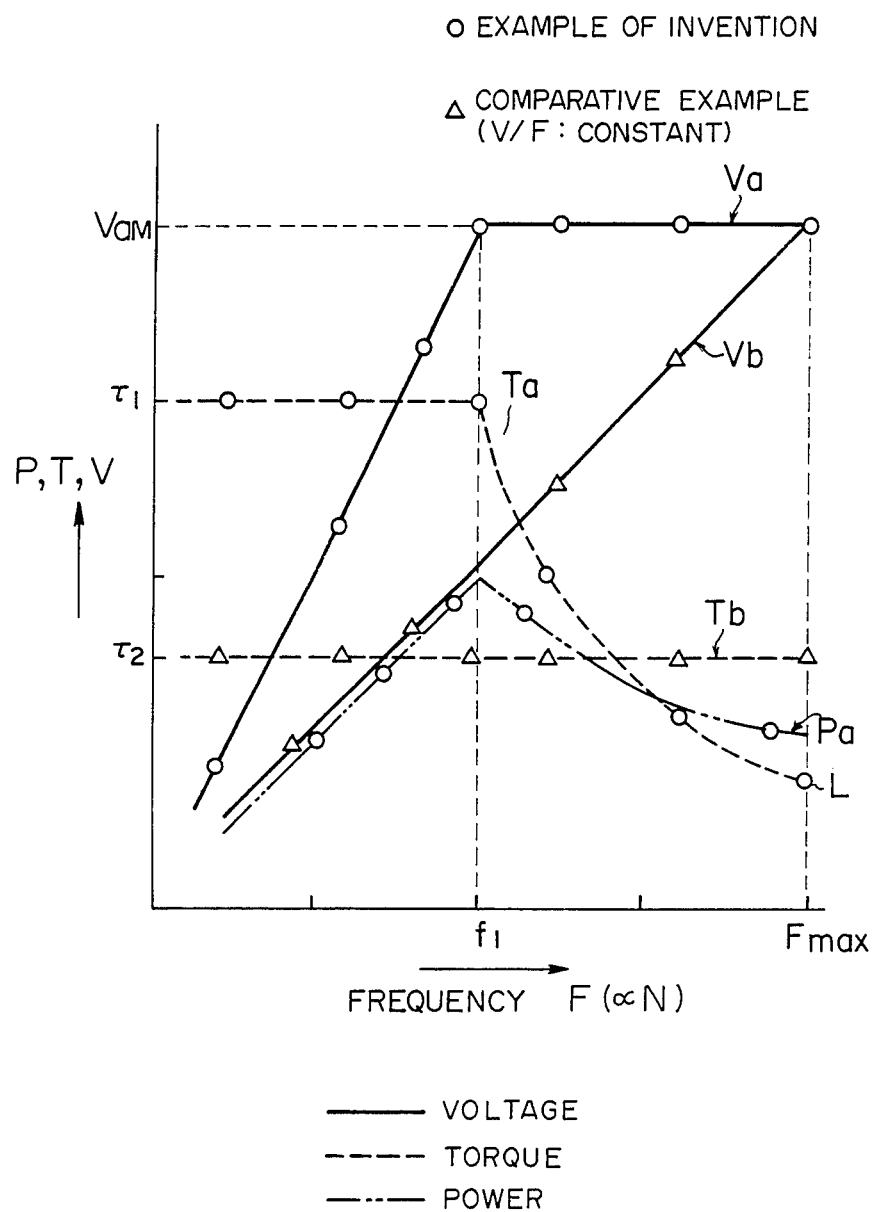
FIG. 2 is a graph showing the characteristics used to explain the operation of the apparatus of FIG. 1 in contrast to the simply assumed aggregation of the known system.

The inverter output V=Va (F) of the control device 4 is controlled by an input voltage $V_G$ (i.e., the output voltage of the generator 3) with the voltage V relative to the frequency F being at maximum at a value VaM in the characteristics curve Va in FIG. 2.

Further, it is necessary for the motor 5 to generate power in such a manner that it accelerates the speed of the internal combustion engine in the accelerating/running mode. Therefore, the inverter output (i.e., the input of the motor 5) of the control device 4 is detected by an input (power) detector 7, and the control device 4 thereby controls the inverter output frequency F and its voltage V such that the output thereof substantially conforms to a pattern of curve or characteristics of V=Va (F) shown in FIG. 2 under the condition where the driving power given to the motor 5 is not greater than the preset maximum level, so that the power of the motor 5 can be made as high as possible.

The above-described control by the control device 4 will be described below in detail.

(1) When the power of the generator 3 is sufficient:

The output of the inverter, i.e., the drive voltage V of the motor 5 relative to an input frequency F thereof, is controlled such that it varies on the basis of the characteristic V=Va (F) of FIG. 2. More specifically, it is controlled such that the motor 5 drives the transmission 8 at constant torque characteristics in which the torque Ta thereof is kept at a fixed value which is a predetermined value $\tau 1$ when the frequency F is at a predetermined value f1 or below, and that it drives the transmission 8 at reduced torque characteristics in which the torque Ta reduces substantially in inverse proportion to the square of the frequency $F^2$ when the frequency F exceeds the predetermined value $f1=(\frac{1}{2})$ Fmax. In this case, the torque value T=Ta (Fmax)=$\tau_L$ at a point L on the curve T=Ta (F) in FIG. 2 is given by $(f1/Fmax)^2 \cdot \tau 1 = (\frac{1}{4}) \cdot \tau 2$.

Since f1=Fmax/2, a predetermined value $\tau 1$ of the torque Ta is about twice as high as a torque value $\tau 2$ at the constant torque characteristic Tb in the most general constant V/F control method.

Further, since the frequency F is proportional to the engine speed N of the internal combustion engine 1, the predetermined value f1 corresponds to the predetermined value n1 which is about one-half of the maximum engine speed Nmax of the internal combustion engine 1.

As a result, the output P of the motor 5 relative to the frequency F (=const. ·N) has a characteristic Pa shown in FIG. 2.

In the example above, the frequency f1 has been assumed to be a half of the maximum frequency Fmax. The frequency f1, however, is selected at an appropriate level to meet the condition $f1=(\frac{1}{3}-\frac{1}{2})$ ·Fmax as explained with reference to the engine operating time ratio D in Fmax. When the condition $f1=(\frac{1}{3})$ ·Fmax is selected, $\tau 1=3 \cdot \tau 2$, and n1=Nmax/3.

(2) When the power of the generator 3 does not reach a level which satisfies its power characteristic Pa (for example, in a case where the method and apparatus of the present invention are used to recover the exhaust gas energy of an engine in a passenger car, when an accelerator pedal is not lowered to a sufficient degree and the generator 3 therefore does not produce a sufficient output):

In this case, the voltage V is controlled such that the motor drives the transmission 8 at the maximum torque T available at a given frequency F. Therefore, the torque characteristics obtained in this case correspond to torque characteristic curve which is moved downward in FIG. 2 in parallel with the curve T=Ta (F).

FIG. 2 also shows the torque characteristic T =Tb (F) and voltage characteristic V=Vb (F) of the comparative example or comparative exhaust gas energy recovering method (in which the motor is controlled such that it has the constant torque characteristics at a torque value $\tau 2$ in which the rated power (the maximum power) is obtained at the maximum engine speed Fmax. i.e., such that V/F is constant so that torque value Tb is always obtained).

It should be noted that, as matter of course, the properties of the motor 5 of the apparatus according to the example or embodiment of the present invention exhibiting the characteristics V=Va (F) and T=Ta (F) are different from those of the motor according the comparative example exhibiting the characteristics V=Vb (F) and T=Tb (F). More specifically, the properties of the motor 5 of the apparatus according to the embodiment of the present invention is such that the product of the input current to the motor 5 and the input impedance thereof at a given frequency in the apparatus according to the embodiment is much higher than that at the given frequency according to the comparative example, if the given frequency lies at low frequency less than f1 or at an intermediate frequency region around f1. For example, the impedance of the motor 5 in the embodiment may be approximately twice as high as that in the comparative example at the same frequency, if differences in other factors such as the magnitude of the slip is assumed to be neglected.

Comparing these characteristics of the comparative method with those of the above-described embodiment, it is clear that, in the low speed area in which the engine speed N of the internal combustion engine 1 is smaller than f1, the present embodiment provides a torque T=Ta (F)=$\tau 1$ which is Fmax/f1 times (about twice) higher than that of the comparative method.

Further, in the high speed area in which F>f1, the torque T=Ta (F) $\sim \tau 1/F^2$ is suppressed, and the motor 5 is therefore prevented from being loaded excessively. In other words, in this embodiment, when the frequency is substantially one-half of the maximum frequency Fmax or above, the power of the generator 3 is controlled by the control device 4 such that the voltage V=Va (F) is const., and that the V/F becomes smaller as the frequency F becomes higher. In consequence, the core loss of the motor 5 is reduced, and high efficiency is ensured in a high speed area in which a large torque is not required. Further, at the low speed area, the core loss is also small because of the low frequency, and power of the generator can be substantially fully utilized up to a rotation speed $f1=(\frac{1}{2}) \cdot Fmax$, enabling sufficient recovery of the exhaust gas energy.

Figure 3:
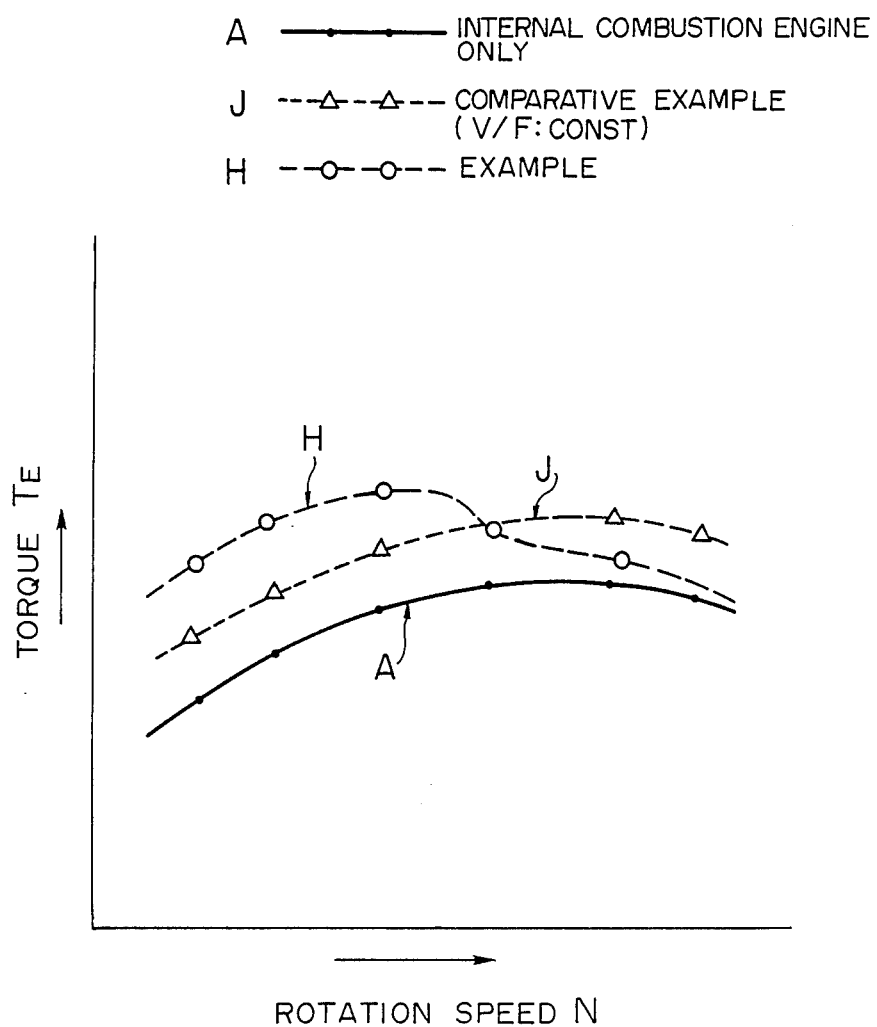
FIG. 3 is a graph showing the torque characteristics used to explain the operation of the apparatus of FIG. 1.
Figure 4:
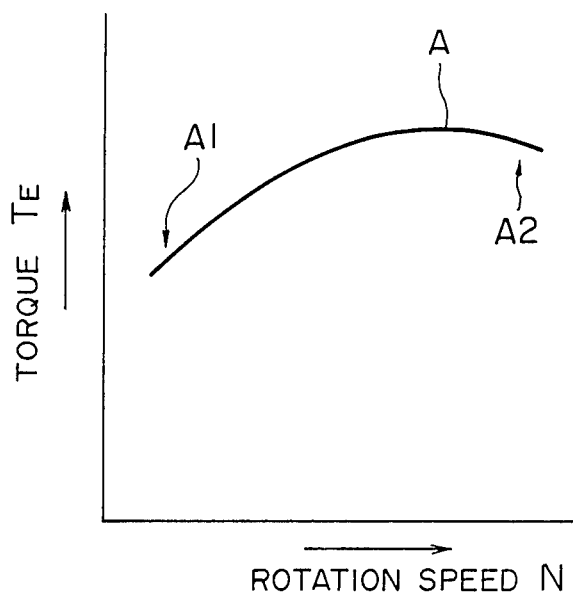
FIG. 4 is a graph showing the general torque characteristics of an internal combustion engine.
Figure 5:
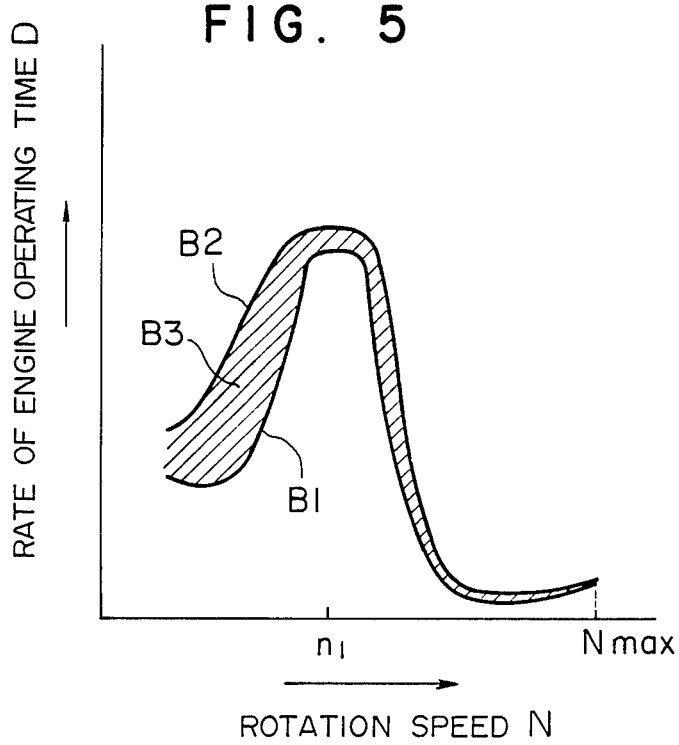
FIG. 5 is a graph showing the general relationship between the rotation speed or engine speed N and the rate of the engine operating time D in an automobile.

FIG. 3 shows the comparison of torque characteristics of the present embodiment with those of the comparative example method. In FIG. 3, the characteristic curve A denotes that of the internal combustion engine only, the characteristic curve J designates that of the comparative example of FIG. 2 defined by V=Vb (F) and T=Tb (F), and the characteristic curve H denotes that of the embodiment or example of the present invention corresponding to that of FIG. 2. As is clear from FIG. 3, according to the embodiment of the present invention, it is possible to obtain a larger or higher torque $T_E$ in a low speed area F≦f1 (N≦n1) in which the operating time rate D is higher, and to thereby provide sufficiently efficient torque characteristics.

Referring back to FIG. 1, the apparatus shown in FIG. 1 also incorporates a rotation detector 6. The control device 4 receives the information of the rotation speed N of the internal combustion engine 1 through the rotation detector 6, and limits the frequency F of the motor 5 within a predetermined value so as to match it to the rotation speed N. As a result, the overload of the motor 5 can be sufficiently suppressed.

More specifically, the control device 4 determines the output voltage V and the frequency F thereof to be given to the ac motor 5 in the form of ac power according to the relationship defined by the curve or two interconnected lines V=Va (F) in FIG. 2 explained before, and start the supply of the ac power thus determined to the motor 5 so as to drive the ac motor 5 at a rotation speed corresponding to the engine speed N of the internal engine 1 detected by the rotation detector 6. Then, the control device 4 continues to adjust the output voltage V given to the motor 5 therefrom and the frequency F thereof, while monitoring the results of detection by the power detector 7, so as to maximize the output torque T of the motor 5. When the voltage V is assumed to be uniquely determined according to the relationship V=Va (F) shown in FIG. 2 for example, the control device controls the frequency F of the output voltage V so as to maximize the power supplied to the motor 5 within a range or limit required to avoid the overload or overcurrent in the motor 5. As a result of this control, the frequency F of the ac voltage and current given to the ac motor 5 will be a little higher than the frequency exactly corresponding to the rotation speed or engine speed N detected by the rotation detector 6.

In the above-described embodiment, the motor 5 is connected to the internal combustion engine 1 through the gears 8 and 9. Therefore, the motor 5 may also serve as a starter motor for the internal combustion engine 1 if an ac power defined by a frequency F and a voltage V which are determined by the inverter of the control device 4 is supplied from the battery 11 to the motor 5.

The present invention or the preferred embodiment of the present invention has the following advantages:

(1) At a low speed area in which a larger torque is required, it is possible to provide a torque T which is Fmax/f1 times (about twice) with the same capacity of generator. This can greatly improve acceleration of an automobile or others.

(2) At a high speed area in which the rotation speed or frequency F of the motor >f1, high efficiency is ensured in spite of the relatively small torque T, because the large torque T is not required at the high speed area by nature. In addition, as the driving torque of the motor or the power to the motor at the high speed area is relatively reduced, the loss at the motor can be decreased, resulting in reduction in the temperature of the motor, prolongation of the life thereof and improvement of the reliability.

(3) Because of a large torque at the low speed area, the change gear ratio of the engine speed to the speed of a propeller shaft can be made large at a given running speed, further reducing the engine speed and greatly saving a fuel.

What is claimed is:

1. A method of recovering exhaust gas energy of an internal combustion engine of a type which incorporates a turbine generator driven by the exhaust gas energy of said internal combustion engine and in which driving power of a motor driven by power generated by said generator is added to driving power of said internal combustion engine, characterized in that said method includes a control device for controlling an output torque of said motor in different forms at low and high speed areas within a variable control range of a rotation speed of said internal combustion engine, and that said motor is operated with constant torque characteristics at said low speed area and with reduced torque characteristics at said high speed area.

2. A method of recovering exhaust gas energy of an internal combustion engine according to claim 1, wherein said motor is an induction motor, and said control device comprises an inverter device of a variable voltage and variable frequency output type.

3. A method of recovering exhaust gas energy of an internal combustion engine according to claim 1, wherein said generator also serves as an auxiliary driving power supply of said internal combustion engine.

4. A method of recovering exhaust gas energy of an internal combustion engine according to claim 1, wherein said motor also serves as a starter motor of said internal combustion engine.

5. A method of recovering exhaust energy of an internal combustion engine according to claim 1, wherein in said high speed area, the torque is inversely proportional to square of a drive frequency of said motor.

6. An exhaust gas energy recovering system for an internal combustion engine comprising: a turbine generator driven by exhaust gas energy of said internal combustion engine; a motor whose output shaft is coupled to an output shaft of said internal combustion engine; and a drive control mechanism for driving said motor by power generated by said generator such that driving power of said motor is added to driving power of said internal combustion engine, wherein said drive control mechanism operates said motor in constant torque characteristics at a low speed area within a variable control range of the rotation speed of said internal combustion engine, and in reduced torque characteristics at a high speed area of said variable control range.

7. An exhaust gas energy recovering system according to claim 6, wherein said reduced torque characteristic is such that an output torque of said motor is inversely proportional to square of a drive frequency thereof.

* * * * *